RADIOGRAPHIC DEVICES

Filed Nov. 29, 1955 8 Sheets-Sheet 1

INVENTORS
SIMON YERKOVICH
LE ROY J. LEISHMAN

BY Le Roy J. Leishman
ASSIGNEE

Oct. 29, 1957 LE ROY J. LEISHMAN ET AL 2,811,648

RADIOGRAPHIC DEVICES

Filed Nov. 29, 1955 8 Sheets-Sheet 2

INVENTORS
SIMON YERKOVICH
LE ROY J. LEISHMAN
BY Le Roy J. Leishman
ASSIGNEE

INVENTORS
SIMON VERKOVICH
LE ROY J. LEISHMAN
BY Le Roy J. Leishman
ASSIGNEE

Oct. 29, 1957 LE ROY J. LEISHMAN ET AL 2,811,648

RADIOGRAPHIC DEVICES

Filed Nov. 29, 1955 8 Sheets-Sheet 4

*INVENTORS*
SIMON YERKOVICH
LE ROY J. LEISHMAN
BY
Le Roy J. Leishman
ASSIGNEE

INVENTORS
SIMON VERKOVICH
LE ROY J. LEISHMAN
BY
Le Roy J. Leishman
ASSIGNEE

RADIOGRAPHIC DEVICES

Filed Nov. 29, 1955 8 Sheets-Sheet 6

INVENTORS
SIMON YERKOVICH
LE ROY J. LEISHMAN
BY
Le Roy J. Leishman
ASSIGNEE

INVENTORS
SIMON YERKOVICH
LE ROY J. LEISHMAN
BY
Le Roy J. Leishman
ASSIGNEE

RADIOGRAPHIC DEVICES

INVENTORS
SIMON YERKOVICH
LE ROY J. LEISHMAN.
BY
Le Roy J. Leishman
ASSIGNEE

United States Patent Office 2,811,648
Patented Oct. 29, 1957

2,811,648

RADIOGRAPHIC DEVICES

Le Roy J. Leishman and Simon Yerkovich, Los Angeles, Calif.

Application November 29, 1955, Serial No. 549,773

5 Claims. (Cl. 250—66)

The invention herein disclosed pertains to means for rapidly bringing an object from a rest position into a series of other predetermined positions at will and in a preselected sequence; and it more particularly relates to devices that are commonly known in the X-ray industry as "spot film tunnels."

Spot film devices are used in fluoroscopy, and their purpose is to make it possible for the fluoroscopist to make radiographs of what he sees on the fluoroscopic screen in the shortest possible time after he sees some condition in the moving organs that appears to have possible diagnostic significance. Such devices are commonly designed so that from one to four exposures may be made upon the same film. It is therefore necessary that the film assume different positions with respect to the central X-ray beam when more than a single radiograph is to be taken upon a given film. For this purpose the unexposed films are placed in light-tight cassettes. These casettes are then placed in a carriage, which is one of the essential components of any spot film device. When an exposure is to be made, this carriage, or a part of the carriage, must so move at the will of the operator that it will place the cassette in such a position with respect to the X-ray beam that the radiograph will appear on the desired portion of the film. The mechanism used for these purposes in the past has been complicated and inefficient.

When radiographs that are the full size of the film are to be made, it is desirable that the cassette move in a straight line from a home or shielded position into a second position in which the center of the cassette coincides with the central X-ray beam. When right and left halves of the film are to be successively exposed, the cassette likewise must move straight toward the position in which it is to be exposed. For exposing upper halves or the first two quarters of a film, the cassette, while moving from its central shielded position to its exposure position, must move downward by a distance substantially equal to one quarter of the distance across the film in a direction transverse to its main direction of travel. When lower halves and lower quarters are to be exposed, the film must move up from its central home position by a distance equal to that required for its downward movement when taking the aforementioned upper halves and upper quarters. The cassette must thus be movable to three different elevations or vertical positions. A variety of mechanisms have heretofore been provided to shift a cassette into any of these three different levels as it moves toward the X-radiated portion of the spot film device. Among means that have heretofore been used to accomplish this purpose are tracks or inclined planes of one type or another. Such a mechanism is disclosed in the copending Leishman application, Serial No. 413,181. Another method employed for this purpose comprises an elaborate system of channels or tracks, and the frame that holds the cassette within the carriage is movably guided by these. The ultimate vertical position of the cassette is determined by a system for switching the tracks or channels into operative position. Although only three different vertical positions are required for the cassette, more than three tracks have heretofore been used to avoid placing any of the tracks behind the screen. One manufacturer that uses channeled tracks has therefore arranged for a wheel attached to the cassette frame to come into alignment with a second channel located beyond the X-radiated area as a first wheel attached to the cassette frame leaves a first track when coming into the field for central exposures. Similar arrangements are provided to guide the cassette frame into either its uppermost or lowermost position, one of the curved tracks cooperating with another outer track that guides the frame into the X-radiated area when the first curved track has guided the frame substantially to the edge of the X-radiated field. In all, there are five channels or tracks employed in the said device for guiding the cassette frame into the three aforementioned vertical positions. One object of the present invention is to provide simpler guiding means or tracks for moving or shifting the cassette frame vertically and it will be found as the specification proceeds that the instant invention has reduced the number of tracks to only two.

Another object of the present invention is to avoid the use of any and all tracks directly behind or under the fluoroscopic screen and to reduce the number of movable tracks to a maximum of two.

A further object of the present invention is the elimination of rotating or "flying" arms behind the screen area and in the area where the cassette rests during fluoroscopy.

Another object is to reduce the mechanism of the device to a minimum.

A still further object is to provide a spot film device that will be quiet in operation.

In devices of the class described herein, it is customary to provide means for pre-selecting the position to which the cassette frame will be moved when it next travels from its shielded position into the X-radiated area. Such a selector is also used for pre-selecting a series of positions into which the cassette will automatically move in sequence. In most spot film devices, the pre-selection is made while the cassette is in its shielded home position, and the mechanism under certain conditions would jam if the seelctor were to be operated while any portion of the cassette is in the X-radiated field. Another object of our invention is consequently to provide a safety lock for immobilizing the sequence selector while the cassette is away from its home position.

Another object of our invention is the provision of riders for the tracks or grooves that will be free from play with respect thereto in order that vibration and inaccurate positioning may be avoided.

The apparatus chosen as an illustrative embodiment of our invention employs a motor driven chain for moving the cassette away from the X-radiated field to its shielded or home position. It is desirable that the cassette frame begin its return movement toward its shielded position immediately after the exposure is made. This means that the chain of the instant embodiment must immediately become engaged with the cassette carriage after such exposure. It is also desirable that the motor not continue to run after the chain has returned the cassette to its shielded location. Another object of our invention is accordingly to provide means for stopping the motor after the carriage has been returned and to effect such stoppage with the chain so positioned that it will immediately become engaged with the carriage after the next ensuing exposure.

Still other objects will appear as the specification proceeds.

Our invention will probably be understood more readily if we explain the construction and operation of a complete spot film device embodying the same. As is well known in the art, the usual spot film device includes a fluoroscopic screen attached in some manner to the top cover. This screen is generally positioned within the half of the cover that is at the left when the spot film device is disposed in the position usually employed for vertical fluoroscopy. The shell or housing of the device is substantially open or hollow to permit a carriage holding a cassette to move from a rest or shielded position at the right end of the tunnel to a position in which the cassette is at least partially behind the screen. The base of the instrument beneath or behind the screen is formed of material that is relatively transparent to X-rays, such as pure aluminum or Bakelite. The cover of the device is provided with an opening within the left half thereof to facilitate the insertion and removal of cassettes. Neither the screen nor the cassette opening is shown in any of the accompanying drawings, nor is the aforementioned X-ray-transparent back portion specifically shown, as none of these things per se are elements of the specific invention herein described and claimed.

Figure 1:
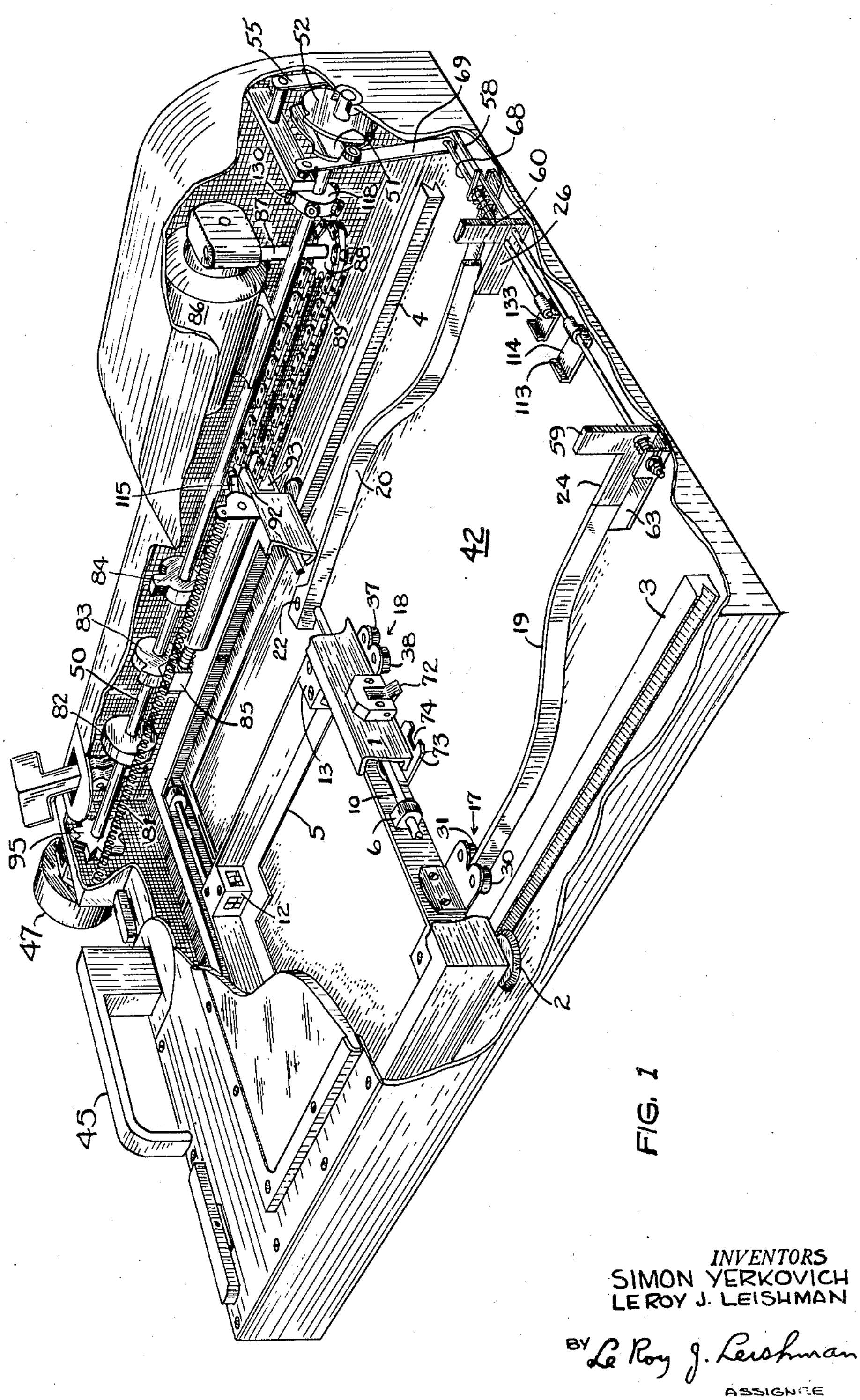
Fig. 1 is a cut away perspective view of an illustrative embodiment of our invention.
Figure 2:
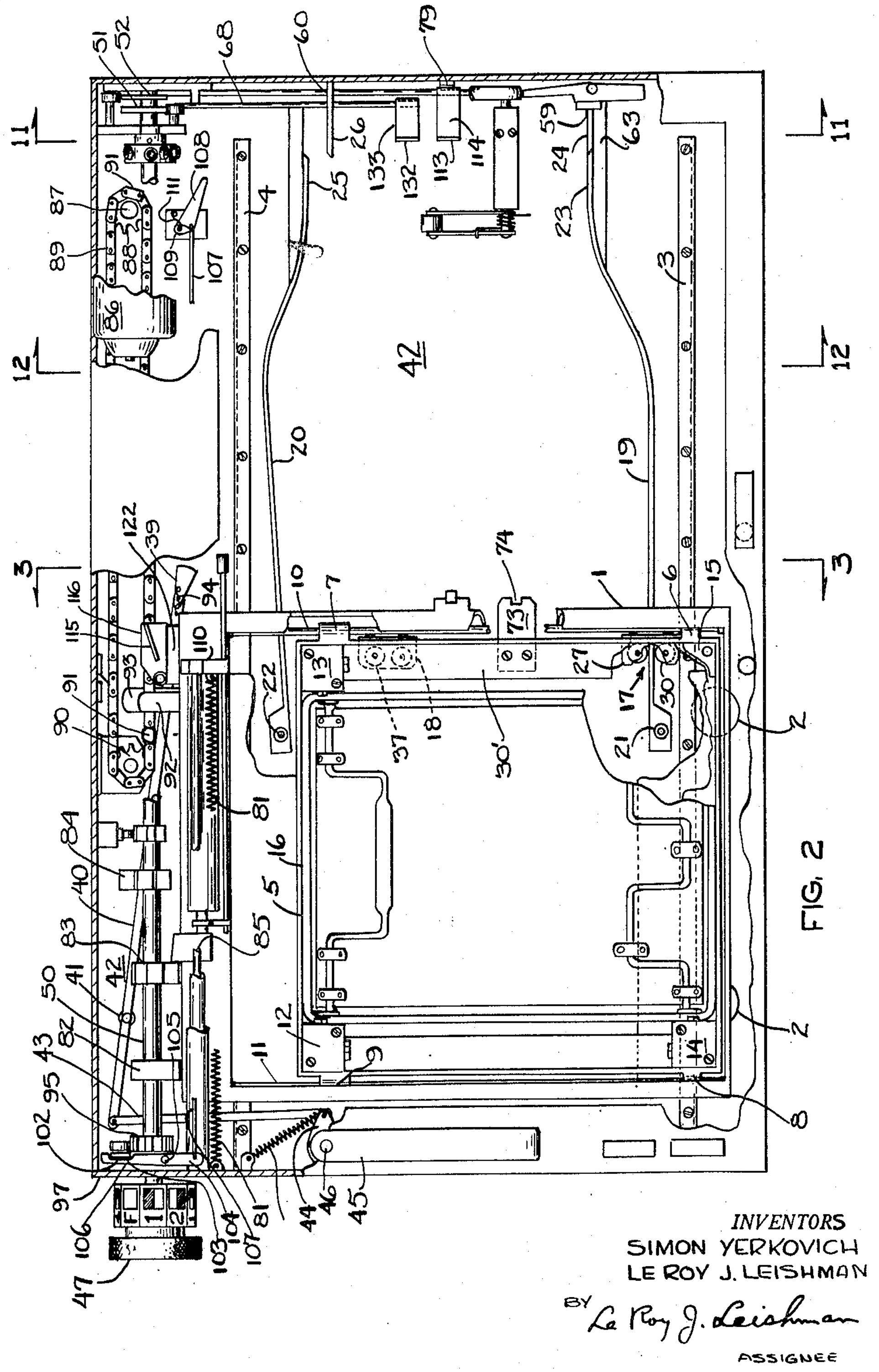
Fig. 2 is a broken away plan view of the device shown in Fig. 1.

The carriage of a spot film device or tunnel embodying our invention may comprise a relatively open rectangular structure 1, Figs. 1 and 2. This structure is provided with four wheels 2, Figs. 1, 2, 3 and 4, which are keyed to appropriate tracks 3 and 4 for rectangular movement therealong. This arrangement permits the rectangular structure 1 to move from the extreme right end of the device to its furthermost operative position at the left end.

As previously mentioned, the cassette within the carriage must sometimes move up or down from a central position within said carriage as the carriage moves along the rails 3 and 4. In order to permit the said up and down movement of the cassette within the carriage, the carriage encompasses a frame 5 which is mounted in any suitable manner for up and down movement within the carriage. In the embodiment herein disclosed, the frame is provided with four longitudinal bearings or ways 6, 7, 8 and 9. A rod 10 extends through the longitudinal bearings 6 and 7 and is appropriately mounted in opposite ends of the carriage 1. Another similar or identical rod 11 extends through bearings 8 and 9 and is likewise mounted in opposite ends of the carriage. This mounting arrangement permits the cassette frame to move up and down on the rods 10 and 11 within the carriage structure 1.

The cassette frame 5 must be provided with suitable means for releasably holding a cassette within the frame in either a vertical or horizontal position. Suitable retaining means 12, 13, 14 and 15 are shown within the drawings, but they are not shown in detail in this specification nor described herein for the reason that they form no part of the present invention but are disclosed in the drawings and specification of application No. 549,750, now U. S. Patent No. 2,811,251. A cassette 16 is shown in Fig. 2 vertically disposed within the frame 5.

Figure 3:
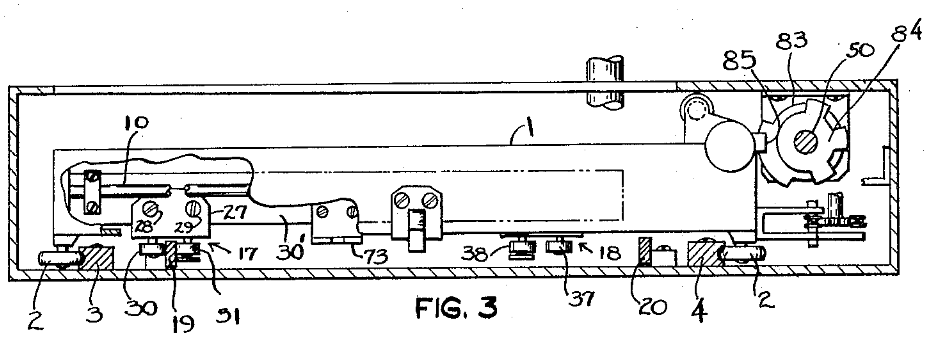
Fig. 3 is a cross section taken on lines 3—3 of Figs. 1 and 2.
Figure 4:
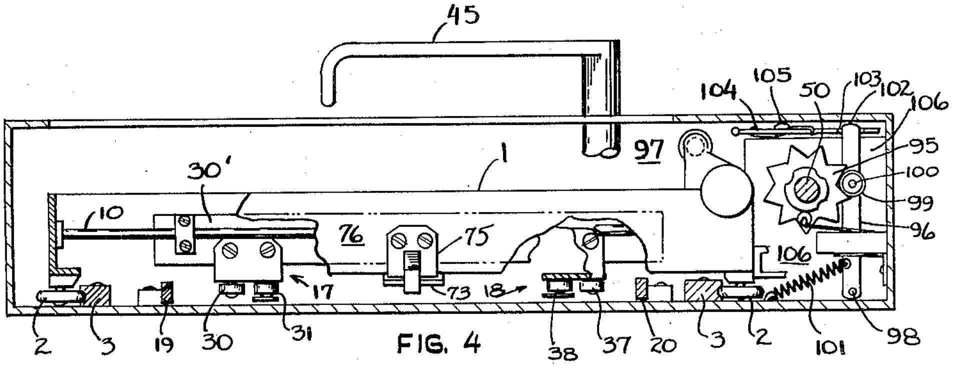
Fig. 4 is another cross section similar to that shown in Fig. 3, but showing the parts in different operational positions.
Figure 10:
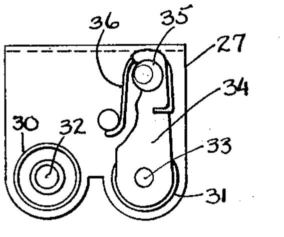
Fig. 10 is a detailed view of the spring-loaded following means which movably keys the cassette frame to the tracks or elongated cams.

The underside of the right end of the cassette frame 5 is provided with a pair of track following means 17 and 18 which are adapted during certain operations of the spot film device to cooperate with and follow the movable tracks 19 and 20, the lower following means 17 being individual to the lower track 19 and the upper following means 18 individual to the upper track 20. Track 19 is pivoted on stud 21 and track 20 on stud 22. These tracks are curved substantially as shown in Figs. 1 and 2, and their right ends are arranged so that in one position of track 19 its right end 23 will abut against, and be aligned with, the short home position track 24, and the upper track 20 is arranged so that its left end 25 will similarly cooperate in one position thereof with a cooperating home position track 26. In Figs. 1 and 2, the lower track-following means 17 is shown in operative engagement with the lower track 19. This following means comprises an L-shaped base member 27, the vertical arm of which is attached by suitable mounting means such as screws or rivets 28 and 29 to the left end 30′ of the cassette frame 5, as shown in Figs. 3 and 4. The horizontal arm of the supporting member 27 of this following means carries ball bearings 30 and 31, Fig. 10. Ball bearing 30 is directly mounted upon the lower side of the L-shaped member 27 by any suitable means, such as by a stub shaft 32; but ball bearing 31 is rotatably mounted upon an appropriate short shaft 33 rigidly carried by the short lever 34. This lever is pivoted on a stub shaft 35 rigidly affixed to the underside of the supporting member 27. A torsion spring or hair spring 36 urge the short lever 34 toward ball bearing 30. This spring-loaded arrangement holds ball bearings 30 and 31 in firm engagement with the outer edges of track 19.

The track following means 18 is provided with two ball bearings 37 and 38, Figs. 3 and 4, which are mounted in the same way as are the ball bearings 30 and 31 of the following means 17.

In Figs. 1, 2 and 3, the following means 17 is shown in operative engagement with track 19. It will be clear from these figures that when this following means is riding the left end of the track 19, the cassette frame 5 will always be in its lowermost position, as illustrated in Figs. 1 and 2. If the carriage is moved to the right from the position shown in these figures, the following means will of course follow the track 19, with the result that the carriage will move upward to a central position as the following means traverses the curve or sloping portion of the track. As the two rollers or ball bearings of this following means leave the track 19 at its right end 23, they will immediately come into engagement with the stationary home position tracks 24. The carriage will then be in its rest position, and the cassette frame will be disposed centrally within the carriage.

Figure 5:
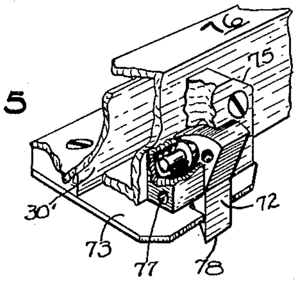
Fig. 5 is a broken away detailed view of a suitable latching arrangement for locking the cassette frame in its central vertical position with respect to the main cassette carriage.

As the carriage approaches its rest position, instrumentalities are actuated that lock the cassette frame against movement within the carriage—for reasons that will hereinafter become apparent. The locking means includes a striker plate 73 suitably attached to the right hand member 30′ of the frame 5. This plate is provided with a slot 74 at its outer end, as shown in Figs. 2 and 5. The right end of the carriage 1 carries a rotatably mounted tongue 72 that cooperates with the slot 74 in the striker plate. The tongue 72 is mounted by means of a block 75 attached to side member 76 of the main carriage frame. This block is slotted to receive the tongue; and a shaft 77, Fig. 5, extends from one side of the block through the tongue 72 and into the other side of the block. Member 72 is pivoted on this shaft; and in its two extreme positions, the lower end 78 of this tongue is capable of being either free from engagement with the striker plate 73 as shown on Fig. 6, or of resting within the slot 74 in the striker plate as indicated in Fig. 7. A detent is provided to yieldably hold the tongue 72 in either of these two positions.

Figure 6:
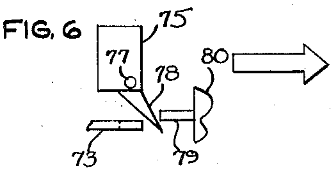
Figs. 6, 7, 8 and 9 show various transitional positions during the operation of the latching means shown in Fig. 5.
Figure 7:
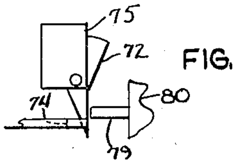

As long as either of the track following means 17 or 18 is in engagement with its associated track, the lower part 78 of the tongue 72 of the locking means must necessarily be out of engagement with the slot in the striker plate, but as the carriage approaches the aforementioned rest position, the lower end 78 of the tongue engages the projecting member 79 attached to the end wall 80 of the main frame as indicated in Figs. 2, 6 and 7. As the carriage continues to move to the right, as indicated by the arrow between Figs. 6 and 7, the latching end 78 of member 72 will be pushed by member 79 into the slot in the striker plate. The cassette frame 5 is thus locked in its central position within the carriage whenever the carriage is in its rest or home position.

The portion of the base 42 of the main housing that lies beneath the carriage when it is in its home position, is provided with suitable lead shielding to protect such film as may be in the cassette from any direct or secondary rays to which the film might otherwise be exposed. The cassette is thus always in a shielded position when it is in its rest or home position.

The cassette frame is of course always in its central position within the carriage when the carriage is in its rest or home position, and cassettes are placed in the frame when the carriage is thus disposed. The cassettes are also removed when the carriage is in this right-most position, and the following means 17 and 18 are then always in engagement with the stationary home tracks 24 and 26.

The carriage is held in this rest position by means of a latch 39 mounted for angular movement within limits on a lever 40 which is rotatable about a stub shaft 41 attached to the base 42 of the main housing. A link 43 is pivoted at its upper end to the left end of lever 40, and the lower end of link 43 is pivotally connected to the short lever 44. This lever and the main operating handle 45 are both rigidly attached to opposite ends of a shaft 46, and these parts are yieldably held in the position shown in Fig. 2 by means of an extension spring 152. The latch 39 engages the left end of the carriage 1 when the carriage is in its aforementioned home position.

As before indicated, the track followers 17 and 18 will be in engagement respectively with the stationary home tracks 24 and 26 when the carriage is in its home position, and it will be obvious that the tracks 19 and 20 may be shifted into and out of engagement with the home tracks 24 and 26 without in any way affecting the carriage when it is thus positioned.

Figure 15:
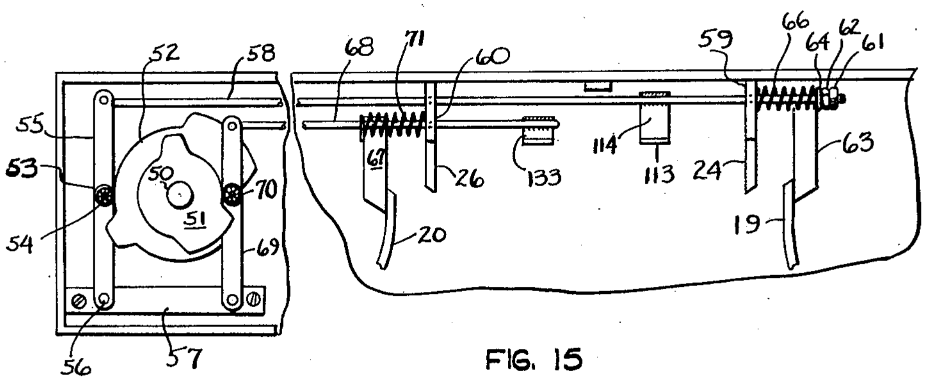
Figs. 15, 16 and 17 are partial plan views and partial vertical sections to illustrate the mechanism for moving the two tracks of the device herein described into and out of operative position.
Figure 19:
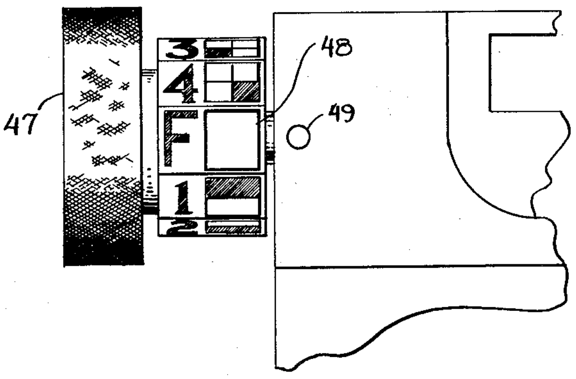
Fig. 19 shows an indicating selector knob suitable for use with certain embodiments of our device, together with a cooperating round spot on the case with which indicia on the selector knob may be aligned.
Figure 27:
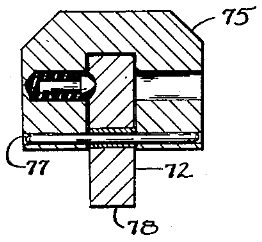
Fig. 27 is a longitudinal section through the locking finger and supporting block otherwise shown in perspective in Fig. 5.
Figure 28:
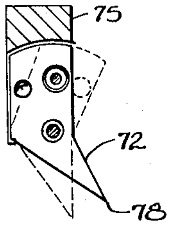
Fig. 28 is a side view of the locking finger of Figs. 5 and 27 showing the indentations that cooperate with the plunger detent for yieldably holding the finger either in or out of engagement with the cooperating striker.
Figure 21:
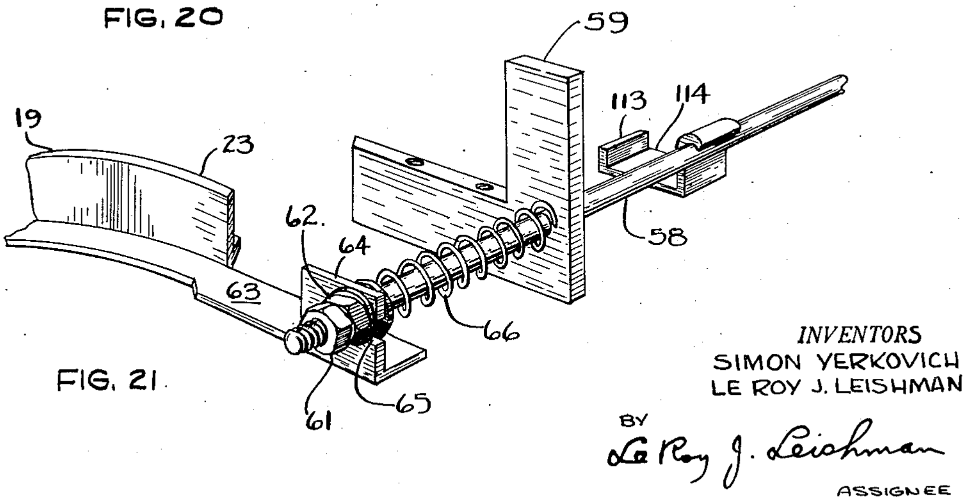
Fig. 21 is a perspective view of the left end of one of the tracks or guiding means used in the preferred embodiment of our device, showing some of the parts operatively connected thereto.

Let us now suppose that the fluoroscopist desires to make a full size radiograph with the cassette positioned vertically. The fluoroscopist or technician will of course first place a cassette in the frame, where it will be retained by means of the aforementioned four corner retainers 12, 13, 14 and 15, as shown in Fig. 2. The fluoroscopist will then turn the technique selecting knob 47 to an angular position at which the facet 48 will be generally aligned with the round spot 49, Fig. 19, which is provided on the case for indexing purposes. The knob 47 is mounted on shaft 50 which carries on its opposite end the two cams 51 and 52 that control the positions of the tracks 19 and 20. The knob and the cams are connected to shaft 50 for angular rotation therewith, and their angular positions are such that when facet 48 is turned into alignment with the indexing spot 49, cam 52 will be aligned substantially as shown in Fig. 15. Through instrumentalities operatively interposed between cams 51 and 52 and the tracks 19 and 20, the tracks will now be disposed as indicated in Fig. 15. Cam 52 controls the position of track 19, and cam 51 controls the position of track 20. Cam 52 cooperates with a follower 53 which may appropriately be a ball bearing rotatably mounted upon a stub shaft 54 carried by lever 55. This lever is pivoted at 56 upon a bracket 57 which is attached in any suitable manner to the main housing. The free end of lever 55 is pivotally attached to a link 58. This link is supported in suitable ways extending through brackets 59 and 60 which may be integral respectively with the home tracks 24 and 26. The outer end of link 58 is threaded to receive the adjusting nuts 61 and 62, Figs. 15, 16, 17 and 21. A bracket 63 is rigidly attached to the outer end 23 of track 19, and the bracket's vertical outer end 64 is provided with a slot 65 to straddle the link 58. A compression spring 66 is interposed between the vertical portion 64 of the bracket 63 and the upright 59 which is integral with the home track 24. The adjustment of bracket 63 with respect to the free end of link 58 is controlled by the nuts 61 and 62 which urge the bracket 63 toward the upright 59 against the action of spring 66. When cam 52 is in the angular position shown in Fig. 16, nut 62 is so positioned on link 58 that the end of track 19 is accurately aligned with the home track 24. Another bracket 67, having a construction similar to that of bracket 63, is provided to connect the outer end of track 20 with the link 68 which is pivotally connected to a lever 69 upon which is rotatably mounted a roller or ball bearing 70 that cooperates with the periphery of cam 51. An expansion spring 71 expands between bracket 67 and bracket 60 in order to urge track 20 away from the home track 26 and to keep follower 70 in constant engagement with cam 51. The parts just described dispose the tracks 19 and 20 in the positions shown in Fig. 15 when the dial is turned so that facet 48 is aligned with the indicating spot 49 on the case, which said alignment indicates that the tracks are properly positioned for the frame to maintain its central position in the carriage as the carriage moves toward the X-radiated area. This position of the tracks, of course, is one in which they are both out of engagement with their associated home tracks.

When the tracks are thus disposed, as a result of turning the selector knob to the position in which the facet 48 is aligned with the indexing dot, the machine is ready to move the cassette into a proper position for taking a full size radiograph at the will of the fluoroscopist. When he sees something upon the fluoroscopic screen that appears to have diagnostic significance, he moves the lower end of lever 45 to the left. This effects the upward movement of latch 39 through the aforementioned instrumentalities that are operatively interposed between the handle-lever 45 and the latch 39. When the latch 39 is thus lifted away from the left side of the carriage 1, the carriage will rapidly move toward the left under action of the extension spring 81. When the track followers 17 and 18 leave the home position tracks upon the initial leftward movement of the carriage, the upper ball bearing 37 of the track following means 18 will pass between the home track 26 and the outer end of track 20, and the track following means 18 will consequently be in the open and entirely out of engagement with the said track. When these tracks are disposed as shown in Fig. 15, with track 19 also out of alignment with its associated home track 24, the lower ball bearing 30 of the track-following means 17 will similarly pass between the home track and the main track, and this following means will likewise be in the open. The cassette frame, however, will nevertheless be retained in its central position by the lock 72 which will remain in the cooperating slot 74 of plate 73 attached to the underside of the left member 30' of the cassette frame 5.

The position in which the carriage will stop in its leftward movement will be determined by the selectively effective abutments 82, 83 and 84 which are rigidly mounted upon the shaft 50. The angular position of this shaft, it will be remembered, was manually determined by the initial setting of the selector knob 47. The abutments 82, 83 and 84 are provided with radially extending projections which are so arranged that the stopper 85, carried by the carriage, will engage a projection of one or other of the rotatable abutments 82, 83 and 84, the particular one that is effective depending, of course, upon the angular position of the shaft 50. In the situation with which we are here dealing, the abutment that will be engaged by the stopper 85 will be the central abutment 83. The structure of these abutments and of the various parts on the carriage that are operatively associated with the stopper 85, are not described in this specification—for the reason that the detailed construction is disclosed and claimed in the co-pending application, Serial No. 413,181 filed by Le Roy J. Leishman, one of the co-inventors of the subject matter claimed in the instant specification. Suffice it to say here, however, that the stopper 85 is mounted upon the shaft of a plunger that is part of a decelerating mechanism that brings the carriage to a gradual stop.

The exposure is made in the customary manner at the will of the fluoroscopist upon his operation of a suitable foot switch or manually operable button. The exact means of causing the exposure to be made is not a part of this invention per se and is immaterial to the specific novel features claimed herein.

Figure 13:
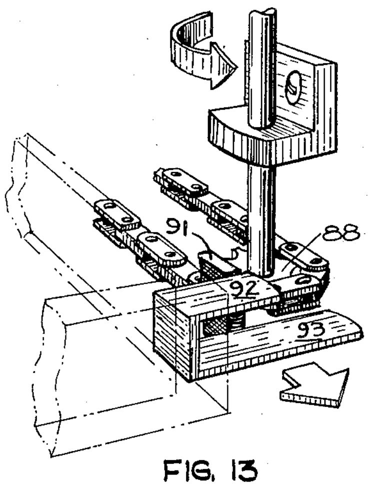
Fig. 13 is a perspective view of part of the mechanism whereby the motor-driven chain returns the main cassette carriage to its inoperative shielded position.

After the exposure has been made, the motor 86 is switched into circuit by appropriate means. The drive shaft of this motor is connected by reduction gearing to a short shaft 87, Figs. 1 and 2, which is connected to a sprocket wheel 88. This sprocket drives a chain 89 that meshes therewith. Chain 89 also meshes with a suitable idler sprocket 90 which, with sprocket 88, serves to mount the chain. The chain carries a dog 91, Figs. 2 and 13. After this dog has moved a short distance to the right from the position shown in Fig. 2, the portions of the dog that extend above and below the chain will engage the prongs 92 and 93 of a forked member attached to the upper end of the carriage in any appropriate manner. As the chain moves, the dog 91, pressing against the prongs 92 and 93, will move the carriage to the right to its home position where the dog 91 will break contact with the prongs as the dog proceeds around the sprocket 88 in a counterclockwise direction. The lower prong 93 is longer than the upper prong 92, and as a consequence the dog 91 does not disengage the prong 93 until the dog has moved over center. During the last portion of the travel of the carriage under action of the dog upon the prongs, the left end of the carriage will have moved below and past the latch 39, which will have moved upwardly slightly against the action of the hair spring 94. This spring, of course, causes the latch to move downward as soon as the left end of the carriage has passed the right end of the latch. The carriage, however, moves slightly beyond this point as the dog 91 proceeds around the sprocket wheel 88; and as the dog moves away from prong 93 when the dog begins its leftward movement around the said sprocket, the carriage comes gently to rest against the end of latch 39. The dog and prong arrangement just described for moving the carriage and bringing it gently to rest in its latched position, is the subject of an independent patent application, Serial No. 549,774, filed in the name of Simon Yerkovich.

When the dog 91 approaches the left sprocket 90, the motor is either de-energized or unclutched in order to stop the chain. We prefer that the motor be de-energized and that it coast to a stop. However, neither of these arrangements for stopping the chain after the completion of the return stroke of the carriage is described in detail in this application, as this feature of the device is disclosed and claimed in another application, Serial No. 550,101, pertaining to electric circuits used in the device, this application being filed in the name of Le Roy J. Leishman.

As the carriage proceeds from the position in which the exposure is made to its shielded or rest position at the right end of the device, it will be apparent that the spring 81 becomes stretched or taut and that energy is thus stored in the spring waiting to be released upon the next actuation of the operating lever 45.

It is advisable that the selector knob 47 be locked against rotation when the carriage is away from its home position. Such an interlock is provided in connection with the detent that yieldingly holds the shaft 50 in any of the nine positions in which it may be placed by aligning one or other of the facets on the knob 47 with the aforementioned indication dot 49, Fig. 19, on the left upper corner of the case or main housing. The detent includes a wheel 95, Figs. 1, 2 and 4, which is provided with equally spaced notches around its periphery. In the illustrative embodiment herein disclosed there are nine such notches spaced 40° apart. The detent wheel 95 is keyed or otherwise suitably attached to the shaft 50 for angular rotation therewith. A lever 96 is pivoted to a block 106 on the right end 97 of the main housing by means of a stub shaft 98. A roller or ball bearing 99 is mounted by a short shaft or rivet 100 upon the side of lever 96, and the parts are so disposed that the roller 99 may be held firmly in any adjoining notch by means of the spring 101, one end of which is attached to the housing and the other to the lever 96. It will be understood, of course, that any other suitable means, such as a torsion spring, may be used to yieldably hold the roller or ball bearing 99 in such notch as may be substantially aligned therewith. The upper end 102 of lever 96 normally lies in a notch or recess 103 in a lever 104, Figs. 1, 2 and 4. This lever is pivoted by means of a shoulder screw or other appropriate mounting means 105 upon a plate 106 attached to the right end 97 of the main casing. The end of lever 104 opposite from that having the recess 103 is pivotally connected to a long link or wire 107. The other end of this link or wire is pivotally attached to member 108, which is rotatably mounted on a pivot 109 at the right end of the main casing. Member 108 is so positioned that its under edge will be engaged by bracket 110 as the carriage moves toward its home position. This engagement of bracket 110 will push the right end of member 108 upward as the bracket moves along the underside of the lever, and these two parts will remain in engagement as long as the carriage is in its home position. It will be noted that the right end of link 107 is attached to member 108 at a point sufficiently removed from the pivot 109 for this link to be pulled to the right as the lever 108 is urged in a counterclockwise direction. Such movement of link 107 pulls the short end of lever 104 to the right, thus moving the opposite end of this lever to the left so that the recess 103 will be out of the path of the upper end 102 of lever 96. Whenever the carriage is in its home position, end 102 of lever 96 is thus free from engagement with lever 104, and lever 96 is therefore free to move. Dial 47 may consequently be turned whenever the carriage is in its home position, and roller 99 will of course move outyard upon the resulting rotation of the detent wheel 95. But if the carriage has moved sufficiently far from its home position to permit lever 108 to move downward under action of the hair spring 111, the notched end of lever 104 will move to the right, causing the recess 103 to slip around the edges of the upper end 102 of lever 96, thus making it impossible for lever 96 to be moved more than the very short distance provided for clearance between the upper end of the lever and the adjacent edges of the recess 103. With the lever 96 thus locked against movement, it will be clear that any attempted rotation of the dial 47 will cause the sides of the detent notch adjacent the roller 99 to abut against this roller, thus preventing rotation of the shaft. The technique selecting knob 47 and all other parts attached to the shaft 50 are consequently locked against rotation whenever the carriage is away from its home position, but the knob may be freely turned in order to set up any desired operative position of the stopping abutments 82, 83 and 84 and of the tracks 19 and 20 whenever the carriage is in its shielded home position.

If the fluoroscopist desires to take two radiographs on the same film, one located above the other, he will turn the selector knob 47 to a position in which the facet 112 will be aligned with the indicating dot 49. This turns the cams 51 and 52 to the positions indicated in Fig. 16. The follower 70 is still on a portion of cam 51 that has the smaller of its two radii, and as a consequence the track 20 is still disposed as shown in Fig. 15. Follower 53, however, now rides a portion of cam 52 having a larger radius. This moves the lever 55, on which roller 53 is mounted, to the angular position indicated in Fig. 16; and rod 58 consequently moves to the left, carrying track 19 into alignment with its companion home position track 24. This track is also shown in this position in Fig. 2.

When the fluoroscopist is ready to make the first of the two exposures on the film in the cassette, he will of course release the carriage by means of the operating handle 45, and the carriage 1 will be pulled toward the left by means of the spring 81. The initial manual alignment of facet 112 with the indicator mark 49, will have turned wheel 118 (Figs. 2 and 14) to an angular position in which bearing 117 will be in the path of projection 115 of the pawl member 116. Projection 115 will of course at this time be on the right side of ball bearing 117, but although it is in the path of lug 115, the leftward movement of the carriage and plate 122, carrying the pawl, will have no effect upon ball bearing 117 or wheel 118 because the engagement of the upper side of lug 115 with ball bearing 117 will merely cause the pawl to move clockwise against the action of spring 120, thus permitting the pawl to move to the left and to pass ball bearing 117.

Figure 8:
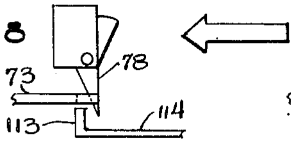
Figure 9:
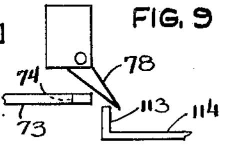
Figure 11:
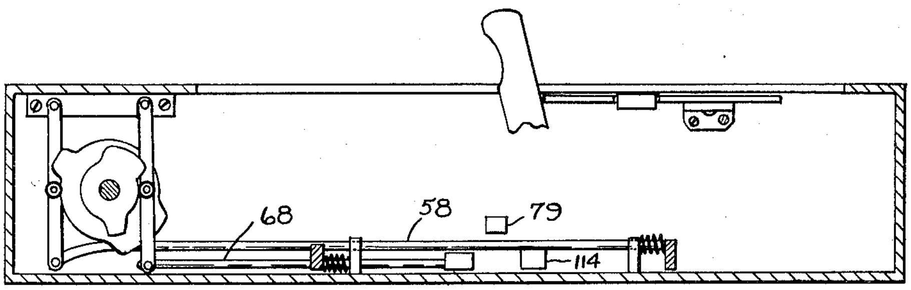
Fig. 11 is a cross-section taken on the line 11—11 of Fig. 2.

After the carriage has moved only a short additional distance from its extreme left position, the lower portion 78 of the tongue 72 will strike the upturned portion 113 of member 114, Figures 1, 2, 8, 9, 11, 15, 16 and 17. During the rotation of shaft 50, in response to the rotation of knob 47 for the alignment of facet 112 with the indicating dot, member 114, which is attached to link 58, will have moved from the position shown in Fig. 15, where it is outside the path of tongue 72, to the central position shown in Fig. 16. It will be noted in Fig. 16 that member 114 is in alignment with the projection 79 which engages tongue 72 for locking purposes. Member 114 will thus now be in the path of the lower end 78 of this tongue when it passes toward the field. The end 78 of the locking tongue will consequently engage the upwardly extending portion 113 of member 114 as indicated in Fig. 8. As the carriage continues to move toward the radiated field position, in the direction indicated by the arrow between Figs. 8 and 9, the tip 78 of the tongue will be moved by the said projection to the position shown in Fig. 9 where it is out of engagement with slot 74 in the striker plate 73. The cassette frame will thus be unlocked and will be free to move within the carriage as the follower 17 moves along the lower track 19. As was the case when taking a full size radiograph, the angular position of the abutment 83 on shaft 50 will be such that a projecting portion of the abutment will intercept the stopper 85 on the plunger of the decelerator mounted upon the carriage. The carriage will consequently stop in a central position as far as right and left location is concerned. The cassette frame will of course now be in the low position shown in Fig. 2 in order properly to align the center of the upper half of the cassette with the central X-ray beam.

Figure 14:
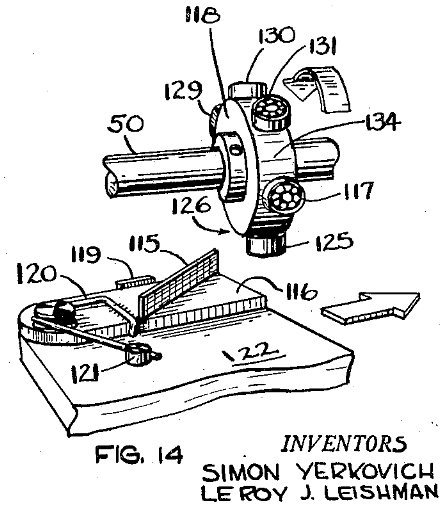
Fig. 14 is a perspective view of the mechanism that advances the rotatable control shaft of our device from one operative position to the next.

When the shaft 50 was manually set so that the abutments and tracks would effect such positioning of the cassette, the ball bearing or roller 117 on member 118, Figs. 2 and 14, came directly under the shaft, as previously mentioned. As the carriage returns home after the exposure of the upper half of the film, the upwardly extending portion 115 of member 116 on the upper right corner of the carriage will engage this ball bearing. The movements that follow this engagement will be better understood if we first further explain the construction, movements and functions of member 116 and wheel 118. Member 116 acts somewhat like a pawl; and wheel 118, with the various ball bearings rotatably attached to its periphery, performs the functions of a ratchet wheel. Member 116 is prevented from moving in counterclockwise direction by the limiting stop 119. Member 116 is held against this stop by the torsion spring 120, one end of which presses against one edge of member 116 and the other end of which is anchored against the short post 121, which is firmly attached to plate 122. Plate 122 is, of course, carried by the main carriage 1. The angle of the upwardly extending portion 115 is such that as the carriage moves in the direction indicated by the arrow in Fig. 15, it will engage the particular ball bearing on wheel 118 that is at that instant positioned directly under the shaft 50, the initial engagement taking place near the tip of the lug 115; and as the carriage continues to move, this lug will rotate wheel 118 in a counterclockwise direction until the lug has passed beyond the wheel. The carriage will of course continue to move until it becomes latched in the home position, as previously explained. The wheel 118 and all other parts that are rotatable with shaft 50 will be turned substantially 40° by the camming action of projection 115 against the aligned ball bearing—in this case ball bearing 117. These parts will be accurately indexed in their new position by the detent 95, as previously set forth.

Figure 12:
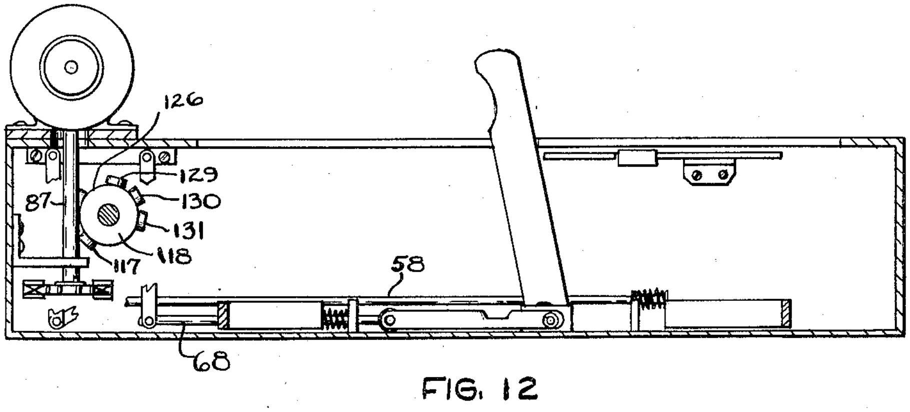
Fig. 12 is a cross section taken on line 12—12 of Fig. 2.

Facet 123 of the dial portion of the operating knob 47 will now be in alignment with the indexing dot. The various parts of the spot film device are accordingly positioned so that the lower half of the film will next be exposed. After the aforementioned 40° rotation of cams 51 and 52, the tracks 19 and 20 will occupy the positions indicated in Fig. 17, but the central abutment 83 on shaft 50 will still present a radially extending portion to the stopper 85 on the decelerator assembly. As a consequence, when the operating handle 45 is next moved to unlatch the carriage, ball bearing 30 on the track follower 17 will pass between the home position track 24 and the end of track 19. Since the end of track 20 will now be in alignment with the home position track 26, the track follower 18 will proceed along track 20, and the cassette frame 5 will be moved to its uppermost position within the frame 1. The carriage will of course be stopped by the engagement of stopper 85 with abutment 83, and the lower half of the cassette will accordingly be aligned with the central X-ray beam for making a radiograph on the lower half of the film. As will be noted in Fig. 12, there are only 5 ball bearings around the periphery of the ratchet wheel 118. When the carriage is next returned to its home position, there will be no ball bearing in the path of the projection 115 of the pawl, and there will consequently be no angular advancement of the ratchet wheel and the various parts that are rotatable therewith. The entire film will now have been exposed, and the cassette is therefore ready to be removed and taken to the dark room for the development of the film.

When the carriage reaches its extreme right position as the dog on the chain turns past the center of the right sprocket wheel just before it permits the carriage to rest against the latch, the lower end portion 78 of member 72 that locks the cassette frame in its central position will of course engage projection 79 on the right end wall 80 of the main housing, thus causing it to move into slot 74 of bracket 73. The cassette frame will now be immobilized in its central position within the carriage. The projection 79 of course locks the cassette frame in its central position every time the carriage comes home, and it remains locked until the tip 78 of the locking member is engaged by member 114 or 133 to unlock the cassette frame in order to permit it to follow one or other of the tracks 19 and 20.

The means for locking the cassette frame within the carriage and unlocking it automatically whenever a track is to be used, is the subject of an independent patent application, Serial No. 549,746, filed in the name of Simon Yerkovich.

Let us now examine the operation of the various parts of the device for taking a right and left half. The fluoroscopist, in order properly to pre-set the machine for taking such a sequence, will turn the manual knob to a position that will align facet 124 with the aforementioned indexing dot. This will again bring the tracks into the position indicated in Fig. 15 so that the cassette frame will move straight toward the X-radiated area. The angular position of the abutments on shaft 50, however, will now be changed and abutment 84 will extend a portion having a maximum radius into the path of the stopper 85 on the decelerator. This will cause the carriage to stop in such a position that the approximate center of the left half of the cassette will be aligned with the central X-ray beam. After the ensuing exposure has been made, the upwardly extending portion 115 of the pawl will engage ball bearing 125, which will have been brought into the path of projection 115 at the time that facet 124 was aligned with the indexing dot. The engagement of projection or lug 115 with ball bearing 125 following the exposure of the left half of the film will cause the shaft and the various rotatable parts thereon to turn to a new angular position in which the open space 126 on the ratchet wheel will be aligned with the camming portion of the pawl. The indicating dial will now be in such an angular position that facet 127 will be aligned with dot 49, thus signifying that the various parts of the mechanism are now so disposed that the cassette, in its next movement into the irradiated section will be properly located for the right half of the film to be exposed. In this new angular position of the various rotatable parts, the ends of tracks 19 and 20 will remain out of alignment with the home position tracks 24 and 26; but the projecting portions of abutments 84 and 83 will no longer be in the path of stopper 85, and the carriage will consequently be free to move to its extreme leftward position in which the center of the right half of the film will be approximately aligned with the center X-ray beam. Inasmuch as the open space 126 of the ratchet wheel is now in alignment with the camming portion 115 of the pawl, there will be no angular advancement of the rotatable parts upon the ensuing return of the carriage to its home position.

Figure 16:
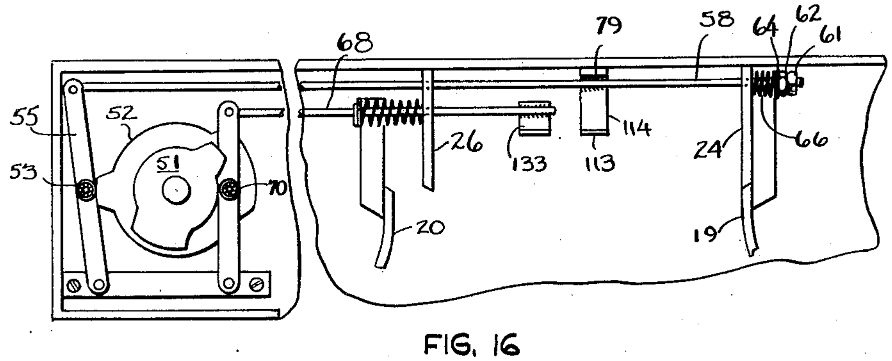
Figure 17:
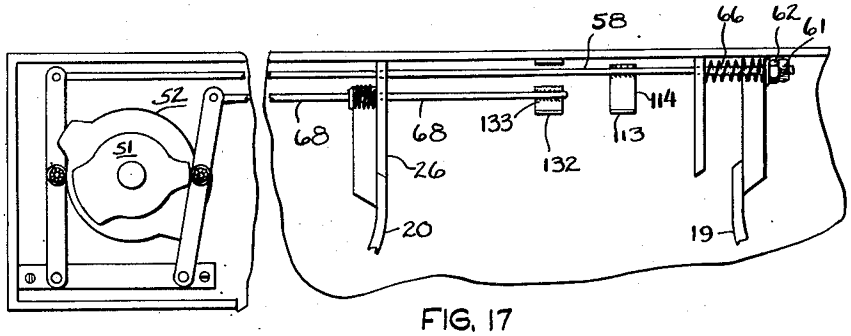
Figure 18:
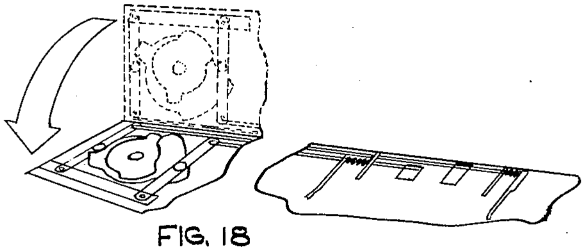
Fig. 18 is a diagram to show how the cams in Figs. 15, 16 and 17 have been oriented from their true positions in order to position them as shown in Figs. 15, 16 and 17 for illustrative purposes.
Figure 20:
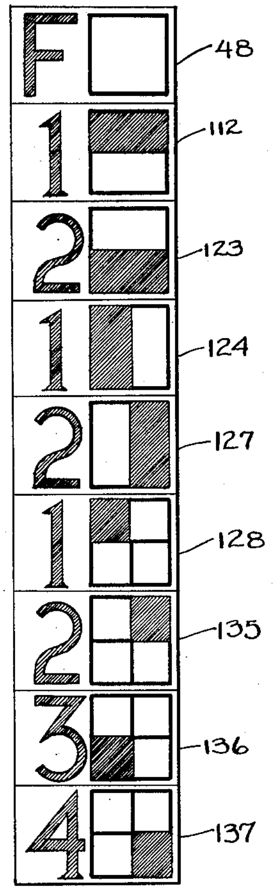
Fig. 20 is a development of the periphery of the selector knob shown in Fig. 19, showing nine facets with appropriate characters thereon to indicate what portion of the film will next be exposed.

We have yet to describe the operations of the device for successively exposing four different quarters of the film. In order to pre-set the device for making quarter-size radiographs in sequence, the fluoroscopist will align facet 128 with the indicating dot 49. This will position the tracks as shown in Figs. 2 and 16, and ball bearing 129 of the ratchet wheel will now be in a position to be engaged by the lug or cam portion 115 of the pawl. The angular position of abutment 84 will now be such that an extending portion thereof will be in the path of stopper 85 on the decelerator assembly. When handle 45 is next operated, the positions of the various parts just set forth will be such that the lug 115 will be brushed aside by ball bearing 129 as the carriage passes through the first portion of its travel, and the cassette frame will be unlocked by the action of the upwardly extending portion 113 of member 114 as the carriage proceeds forth toward the X-radiated position. The track follower 17 will proceed along its associated track 19 and the cassette frame will accordingly be moved to its lowermost position in the frame. The engagement of stopper 85 with abutment 84 will so position the cassette that the approximate center of the upper left hand corner of the cassette will be properly aligned for exposing this portion of the film. After such exposure, the return of the carriage will cause the camming portion 115 of the pawl to engage ball bearing 129 and thereby move the ratchet wheel 118 and all other interconnected rotatable parts through a segment of 40°, thus bringing ball bearing 130 into the path of the pawl. None of the projecting fingers of abutments 84 or 83 will now be in the path of the stopper 85, but abutment 82 will be in such path. The tracks 19 and 20 will remain in the position shown in Figs. 2 and 16. When handle 45 is next actuated in order to expose the second quarter of the film, the carriage will again move downward to its lowermost position, but the carriage will proceed to the left until stopper 85 engages abutment 82, thus positioning the film so that the center of its upper right quarter is substantially aligned with the central X-ray beam.

When the carriage next returns to its home position, the camming lever 115 of pawl 116 will engage ball bearing 130 of the ratchet wheel and advance all the rotatable parts on shaft 50 to the next operating position. Cams 51 and 52, upon this rotation of the shaft, will effect the movement of the tracks from the position shown in Fig. 16 to the position shown in Fig. 17, and a projection on abutment 84 will again come into the path of member 85 on the decelerator plunger. Ball bearing 131 on the ratchet wheel will now be aligned with the pawl, but inasmuch as it engages the upper side of lug 115, the pawl will be pushed out of the way during the initial movement of the carriage toward the X-ray beam. The latching member 72 will this time engage the upwardly extending portion 132 of member 133 attached to rod 68, thus unlocking the cassette frame so that it may move upwardly as the track-follower 18 proceeds along the upper track 20. Because of the aforementioned position of abutment 84, the carriage will now stop in such position that the approximate center of the lower left hand quarter will be aligned with the central X-ray beam for the exposure of this portion of the film.

As the carriage next returns to its home position, the underside of lip 115 of the pawl will this time engage ball bearing 131, thus again advancing all rotatable parts through another angle of 40°. The angular position of cams 51 and 52 will now be such that the tracks will remain in the position shown in Fig. 17, but the projecting portions of abutments 84 and 83 that are provided to stop the carriage will this time be out of the path of stopper 85. The open space 134 will now be aligned with the pawl 116, and there will consequently be no engagement with the pawl during the next movement of the carriage into and away from the X-radiated field. When the carriage proceeds to the left, the positions of the tracks and abutments that have just been described will be such that the lower right hand quarter of the cassette will be properly aligned for the exposure of the corresponding portion of the film. This completes the four quarters in the series, and because of the alignment of the open section 134 on the ratchet wheel with the pawl, there will be no angular advancement of the rotatable parts as the carriage returns to its home position after this fourth exposure in the series.

As the rotatable parts were advanced for making the exposures for the second, third and fourth quarters just mentioned, the dial was of course advanced with each movement of the shaft so that segments 135, 136 and 137 were successively aligned with the indexing dot 49, thus enabling the fluoroscopist to tell in advance which quarter of the film would next be exposed.

It will of course be apparent that the cassette could be placed in the cassette frame 5 in either its vertical or horizontal position for making not only an exposure of the entire film, but for taking upper and lower halves, right and left halves, or a series of four quarters.

The ball bearing "ratchet" wheel arrangement and the "pawl" device for advancing it, are the subject of a copending patent application, Serial No. 549,775.

Figure 22:
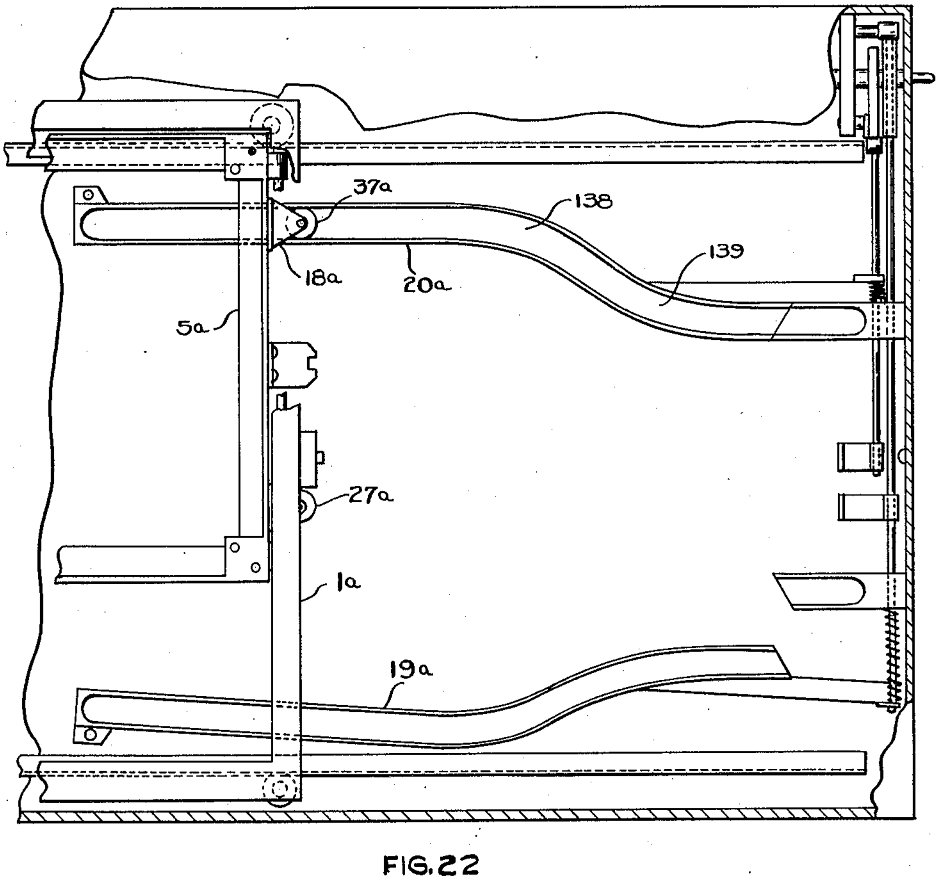
Fig. 22 is a cut away plan view of one end of a spot film device embodying a modified form of track or guiding means.
Figures 23, 24:
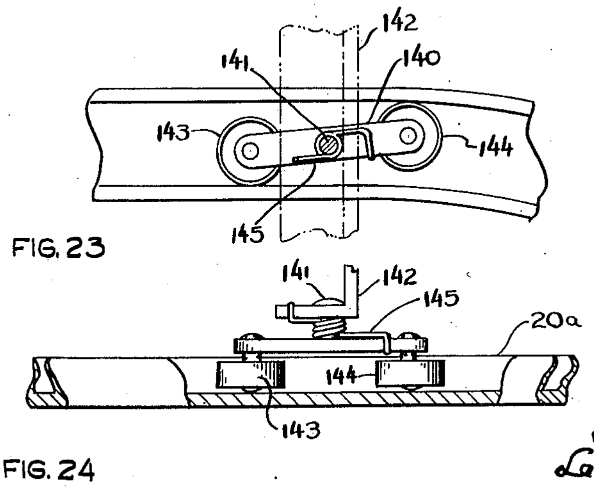
Fig. 23 illustrates a spring loaded following means whereby a cassette frame may be movably keyed to guide channels of the type shown in Fig. 22.
Fig. 24 is a broken away elevation of the components shown in Fig. 23.

It is not essential to the employment of the fundamental principles of our invention that the tracks be formed as shown in any of the figures that have been referred to in the foregoing explanation of the workings of the previously described illustrative embodiment. Fig. 22 shows a modification in which the tracks 19 and 20 of the previously described figures have been replaced by channels **19*a* and 20*a* respectively. When such channels are used, a single ball bearing such as 27*a* and 37*a* may be employed on the track followers that move the carriage 5*a* vertically with respect to the carriage 1*a*. It will of course be apparent that some play must be provided between such ball bearings 27*a* and 37*a* and the channels in order to prevent any binding against the inner walls of the channel and to take full advantage of the use of a roller or ball bearing instead of a nonrotatable follower. It will be clear that a rotatable follower will rotate in different directions in accordance with whether it is engaging the upper wall or the lower wall of the groove. As the carriage proceeds to the right from the position shown in Fig. 22, the ball bearing 37*a*, though it may initially be in engagement with the lower side of the track, will at once engage the upper side of the track when it comes in contact with the curved portion 138 of the channel. It will again change its direction when it comes into contact with the curved portion 139. Similar reversals of the direction of rotation of the ball bearing 37*a* will take place when the carriage is moving away from its home position, but the directions of movement in each case will be opposite. In order to eliminate the necessity of play between roller or ball bearing followers when a channel is used for the track, the arrangement in Figs. 23 and 24 may be employed. In this modification, a rocker arm 140 is rotatably mounted on a rivet or shaft 141 on the underside of the carriage frame 142, and ball bearings 143 and 144 are pivotally mounted at opposite ends of the arm. A torsion spring 145, anchored at one end to the frame and at the other end against arm 140, holds the ball bearings 143 and 144** in firm engagement with the opposite walls of the channel.

Figure 25:
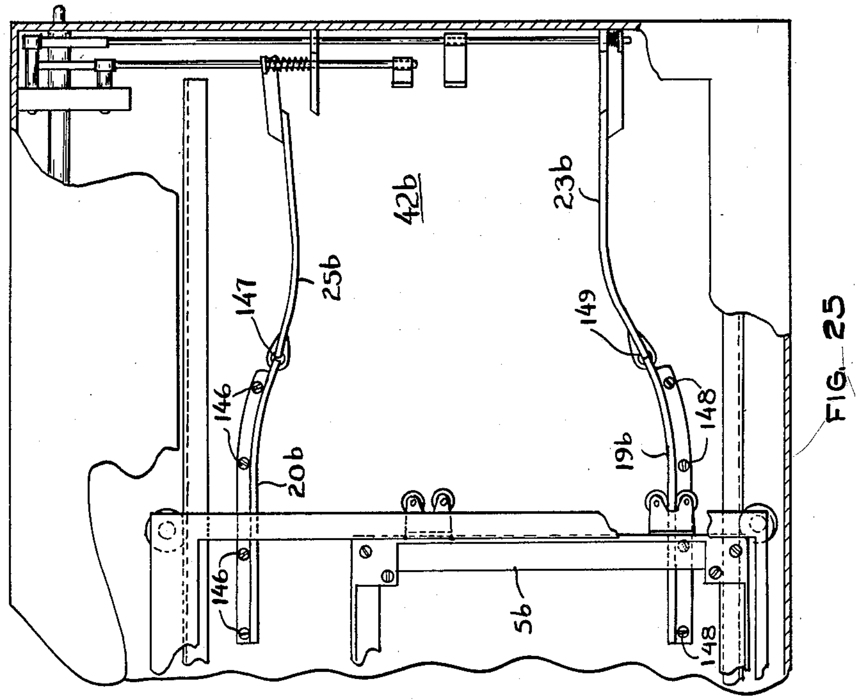
Fig. 25 shows another form of track or guiding means that may be employed in embodiments of our invention. In this species, the rails are pivoted near the left end.

Fig. 25 shows still other modifications that may be made in the means for guiding the cassette frame toward its upper and lower positions. The guiding means may be rails or channels having any cross sectional form that may conveniently be used for the purpose. The upper rail 20b is rigidly affixed to the base of the device **42*b* by screws or rivets 146, and the right end of the guiding means 25*b* is pivoted at 147. The lower guiding means 19*b* is rigidly affixed to the base member 42*b* by means of screws or rivets 148, and the right end 23*b* of the lower guiding means is pivoted at 149. When this modification is used, less weight is carried by the cams 51*b* and 52*b* than is carried by the corresponding cams 51 and 52** in the first embodiments described herein.

Figure 26:
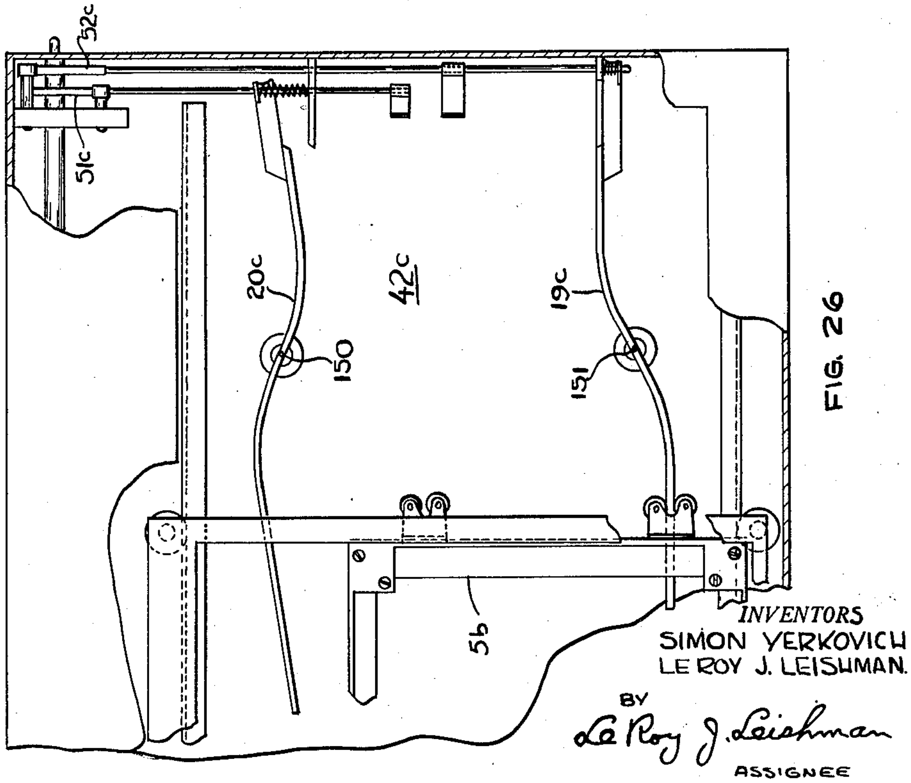
Fig. 26 shows another arrangement of the tracks that may be used in various embodiments of our invention. In this species the tracks or elongated camming means are centrally pivoted.

In the modification illustrated in Fig. 26, the tracks **19*c* and 20*c* are each continuous throughout their lengths and are pivoted intermediate their ends instead of at the extreme left end as in the embodiment shown in Figs. 1, 2, etc., or in Fig. 22. Rail 20*c* of Fig. 26 is pivoted to the base 42*c* at 150, nad rail 19*c* is pivoted at 151. In this arrangement, very little weight, if any, is carried by the cams 51*c* and 52*c*** when the machine is disposed in a vertical position, as the rails substantially counterbalance themselves, since they are pivoted near their centers of gravity.

Many other modifications may be made from the structures and embodiments herein described, and various parts may be transposed or omitted and replaced by other parts performing their same functions without departing from the broad spirit of our invention as succinctly set forth in the appended claims.

Our claims are:

1. In a spot film device, an area for receiving X-rays; a rectilinearly movable carriage for supporting a cassette; a pair of relatively short tracks interposed between said area and one end of said device, said tracks extending generally parallel to the direction of movement of said carriage and having a spacing less than the distance across said area in a direction transverse to the longitudinal axis of said device; a pair of relatively long tracks disposed with corresponding ends astride said area, the opposite end of each of said relatively long tracks being movable from an operative position in which it is aligned with the nearest of said relatively short tracks to an inoperative position in which it is not so aligned; a first track-following means for moving said cassette in a path substantially parallel to one of said relatively short tracks and its associated long track upon the traversal of said one of said relatively short tracks and its associated long track by said first track-following means when the latter track is in its operative position; and a second track-following means for moving said cassette in a path substantially parallel to the other of said relatively short tracks and its associated long track upon the traversal of said relatively short track and its associated long track by said second track-following means when the latter track is in its operative position.

2. In a spot film device, an area for receiving X-rays; a rectilinearly movable carriage for supporting a cassette; a pair of relatively short tracks interposed between said area and one end of said device, said tracks extending generally parallel to the direction of movement of said carriage and having a spacing less than the distance across said area in a direction transverse to the longitudinal axis of said device; a pair of relatively long tracks disposed with corresponding ends astride said area, the opposite end of each of said relatively long tracks being movable from an operative position in which it is aligned with the nearest of said relatively short tracks to an inoperative position in which it is not so aligned; a first track-following means for moving said cassette in a path substantially parallel to one of said relatively short tracks and its associated long track upon the traversal of said one of said relatively short tracks and its associated long track by said first track-following means when the latter track is in its operative position; and a second track-following means for moving said cassette in a path substantially parallel to the other of said relatively short tracks and its associated long track upon the traversal of said relatively short track and its associated long track by said second track-following means when the latter track is in its operative position; each of said relatively long tracks consisting of a stationary section adjoining said X-radiated area and a pivoted section interposed between the stationary section and the associated relatively short track.

3. In a spot film device, an area for receiving X-rays; a rectilinearly movable carriage for supporting a cassette; a pair of relatively short tracks interposed between said area and one end of said device, said tracks extending generally parallel to the direction of movement of said carriage and having a spacing less than the distance across said area in a direction transverse to the longitudinal axis of said device; a pair of relatively long tracks disposed with corresponding ends astride said area, the opposite end of each of said relatively long tracks being movable from an operative position in which it is aligned with the nearest of said relatively short tracks to an inoperative position in which it is not so aligned; a first track-following means for moving said cassette in a path substantially parallel to one of said relatively short tracks and its associated long track upon the traversal of said one of said relatively short tracks and its associated long track by said first track-following means when the latter track is in its operative position; and a second track-following means for moving said cassette in a path substantially parallel to the other of said relatively short tracks and its associated long track upon the traversal of said relatively short track and its associated long track by said second track-following means when the latter track is in its operative position; at least one of said relatively long tracks pivoted at the end adjoining the X-radiated area.

4. In a spot film device, an area for receiving X-rays; a carriage mounted for movement in and out of said area; a cassette holder mounted on said carriage for movement in a direction transverse to the direction of movement of said carriage; a pair of relatively short tracks interposed between said area and one end of said device, said tracks extending generally parallel to the direction of movement of said carriage and having a spacing less than the distance across said area in a direction transverse to the direction of movement of the carriage; a pair of relatively long tracks disposed with corresponding ends astride said area, the opposite end of each of said relatively long tracks being movable from an operative position in which it is aligned with the nearest of said relatively short tracks to an inoperative position in which it is not so aligned; a first following means attached to said cassette holder for traversing one of said relatively short tracks and its associated relatively long track when they are aligned; and a second following means attached to said cassette holder for traversing the other relatively short track and its associated relatively long track when the latter is in its operative position.

5. In a spot film device, having a frame for releasably holding a cassette and means for moving said holder from a rest position to any of a plurality of different exposable positions with respect to an X-ray beam, a combination including: rotatable programming means for preselecting by its angular orientation the particular exposable position to which said means will next move said frame; a detent wheel positively connected to said programming means and having circularly disposed indentations for indexing said programming means in the angular positions that are specifically associated with the various exposable positions of said frame; a follower mounted for movement in and out of said indentations; yieldable means for holding said follower in any of said indentations; a locking member movable from a first position in which it blocks the movement of said follower from any indentation in which it may be nesting to a second position in which it releases said follower; and means responsive to the return of said frame to its rest position for moving said locking member from said first position to said second position.

References Cited in the file of this patent

UNITED STATES PATENTS 2,749,445 Stava ------------------ June 5, 1956